United States Patent

[11] 3,631,490

| [72] | Inventor | Chester A. Palmieri<br>New Hyde Park, N.Y. |
|---|---|---|
| [21] | Appl. No. | 807,689 |
| [22] | Filed | Mar. 17, 1969 |
| [45] | Patented | Dec. 28, 1971 |
| [73] | Assignee | Sperry Rand Corporation |

[54] SIGNAL PROCESSOR FOR REDUCING CLUTTER AND ELIMINATING RANGE AMBIGUITIES IN TARGET DETECTION SYSTEMS
15 Claims, 5 Drawing Figs.

[52] U.S. Cl................................................... 343/7.7,
343/17.1, 343/100 CL, 235/181
[51] Int. Cl....................................................... G01s 7/28,
G01s 9/42
[50] Field of Search.......................................... 343/7.7,
17.1, 100.7; 235/181

[56] References Cited
UNITED STATES PATENTS

| 3,157,781 | 11/1964 | Gruen | 235/181 |
| 3,374,478 | 3/1968 | Blau | 343/100.7 X |
| 3,441,931 | 4/1969 | Shrader | 343/7.7 |
| 3,480,953 | 11/1969 | Shreve | 343/7.7 |
| 3,500,400 | 3/1970 | Woerrlein | 343/7.7 X |

*Primary Examiner*—T. H. Tubbesing
*Attorney*—S. C. Yeaton

ABSTRACT: Apparatus for processing target detection system signals consisting of two pulse sequences of different pulse repetition frequencies reflected from a radially moving target and noise or clutter signals reflected from a relatively stationary background. The apparatus comprises two matched filters responsive to the signals having frequency responses matched respectively to the frequency spectra of the two pulse sequences. A multiplier provides an output signal representative of the product of the signals from the two matched filters.

INVENTOR
CHESTER A. PALMIERI
BY
ATTORNEY

Patented Dec. 28, 1971

INVENTOR
CHESTER A. PALMIERI
BY
ATTORNEY

SIGNAL PROCESSOR FOR REDUCING CLUTTER AND ELIMINATING RANGE AMBIGUITIES IN TARGET DETECTION SYSTEMS

BACKGROUND OF THE INVENTION

1. Field of the Invention

The present invention pertains to signal processing apparatus for use in target detection systems such as radar systems, and particularly to means for processing return signals comprising sequences of pulses so as to reduce clutter and eliminate range ambiguities.

2. Description of the Prior Art

A problem commonly encountered in the detection of targets is the discrimination between the return signals from a moving target, such as an aircraft, and noise or clutter signals from a relatively stationary background, such as chaff. Target detection systems concerned with solving this problem commonly employ a transmitted signal comprising a finite sequence of pulses. The doppler frequency shift experienced by the signal reflected from the moving target serves to distinguish this signal from those reflected from the background. However, the pulse repetition frequencies most effective in clutter discrimination often result in large numbers of range ambiguities at the useful ranges of the system. Often a pulse repetition frequency must be chosen that represents a compromise between effective clutter rejection and numbers of range ambiguities at the ranges of interest. The problem of range ambiguities is compounded for a multiple target environment.

Some target detection systems employ waveforms such as swept frequency modulated carrier signals. Apparatus for processing returns from such signals are frequently relatively ineffective in removing clutter components.

SUMMARY OF THE INVENTION

The present invention is a signal processor for use in target detection systems such as radar systems whose transmitted signal comprises two finite sequences of pulses having different pulse repetition frequencies. The frequencies are chosen to be effective in clutter rejection and are selected so that the range ambiguities associated with one sequence of pulses are noncoincident with those of the other sequence of pulses throughout the useful ranges of the system.

The invention comprises two matched filters responsive to the return signals having frequency responses matched respectively to the frequency spectra of the two pulse sequences after reflection from a moving target. The matched filters are effective in removing clutter components from the return signals. A multiplier provides the product of the signals from the matched filters. Since the desired responses from the two pulse sequences are coincident in time and the range ambiguities are noncoincident, the multiplier provides an output signal from which range ambiguity components are substantially eliminated.

BRIEF DESCRIPTION OF THE DRAWINGS

Referring now to the drawings.

DESCRIPTION OF THE PREFERRED EMBODIMENTS

The present invention is a signal processor primarily for use in target detection apparatus, such as radar and sonar systems. For purposes of description, the invention will be explained as part of a pulse-doppler radar system.

Figure 1:
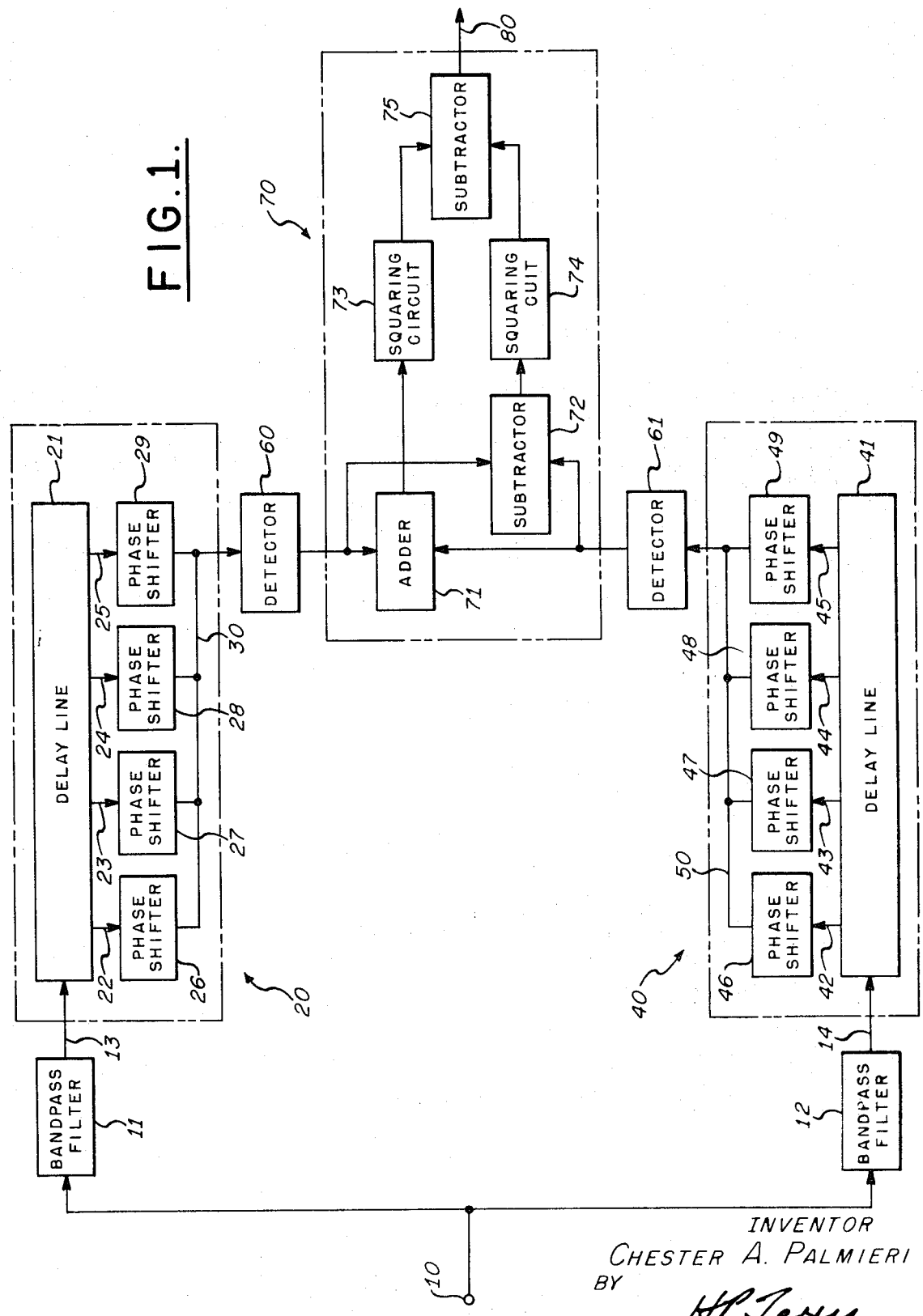
FIG. 1 is a schematic diagram in block form of a signal processor incorporating the present invention.

Referring now to FIG. 1, input terminal 10 is connected to band-pass filters 11 and 12 which in turn connect to signal enhancing means 20 and 40, respectively. The signal enhancing means are, for example, matched filters. Matched filter 20 includes a tapped delay line 21 having an input terminal 13 and output taps 22, 23, 24 and 25 which taps connect to phase shifters 26, 27, 28 and 29, respectively. The signals from the phase shifters 26, 27, 28 and 29 are combined via a combining conductor 30.

The matched filter 40 is configured similarly to matched filter 20 and comprises input terminal 14, delay line 41, taps 42, 43, 44 and 45, phase shifters 46, 47, 48 and 49 and combining conductor 50.

The combining conductors 30 and 50 are connected to envelope detectors 60 and 61, respectively, which in turn connect to multiplier 70. Multiplier 70 provides the algebraic product of the two signals from envelope detectors 60 and 61. The multiplier 70 includes an adder 71 and a subtractor 72 both connected to receive the signals from the detectors 60 and 61. Adder 71 is connected to a squaring circuit 73 and subtractor 72 is connected to a squaring circuit 74. The squaring circuits 73 and 74 provide the algebraic squares of their respective input signals. The squaring circuits 73 and 74 are in turn connected to a subtractor 75 which provides the processed output signal on the terminal 80.

Figure 2:
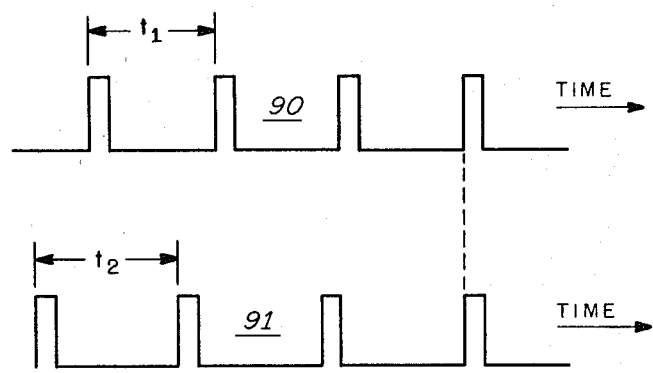
FIG. 2 is a graph representing typical waveforms transmitted by a target detection system incorporating the signal processor shown in FIG. 1.

In operation, input terminal 10 is adapted to receive the return signals due to the reflection from a moving target (not shown) and a relatively stationary background (not shown) of pulse sequences 90 and 91 as depicted in FIG. 2.

Continuing now with FIG. 2, the pulse sequences 90 and 91 represent pulse modulated carrier signals having different carrier frequencies. The pulses are transmitted phase coherently with respect to each carrier, that is, each pulse begins at the same phase angle of the carrier cycle. The pulses of both sequences have uniform interpulse time separations $t_1$ and $t_2$ respectively (as indicated by the legend). The pulses of sequence 90 are noncoincident in time with the pulses of sequence 91 except for the last pulse of each sequence.

The pulse sequences 90 and 91 are characterized by frequency spectra having a plurality of discrete frequency bands. Such a frequency spectrum is sometimes referred to as a comb spectrum. The central tooth of each comb spectrum is centered at the frequency of the respective carrier and the teeth of the comb are uniformly separated in frequency by the reciprocal of the respective interpulse time separations. The carrier frequencies are chosen so that the two frequency spectra are separated.

Whenever the pulse sequences 90 and 91 are reflected from a target (not shown) having a velocity component along a radius extending from the radar receiving antenna (not shown) to the target, the comb spectra are shifted along the frequency axis in accordance with the doppler effect and in an amount proportional to the magnitude of the velocity component.

The pulse sequences reflected from a relatively stationary background experience little shift in frequency.

Thus the composite return signal from a radially moving target in a relatively stationary background (for example an approaching aircraft releasing metallized chaff as a countermeasure expedient) comprises two pulse sequences reflected from the target and two pulse sequences reflected from the background. The pulse sequences reflected from the target possess doppler shifted spectra whereas the sequences reflected from the background exhibit little shift in spectra. The latter reflected sequences represent the clutter components of the composite return signal.

Referring now to FIG. 1 and FIG. 2, the composite return signal on terminal 10 is conducted to the band-pass filters 11 and 12. Band pass filter 11 is adapted to pass the return signals from pulse sequence 90 and block those from pulse sequence 91. Conversely, the band-pass filter 12 passes return signals from pulse sequence 91 and blocks those from pulse sequence 90. Therefore, matched filter 20 receives return signals exclusively from pulse sequence 90 and similarly matched filter 40 receives return signals solely from pulse sequence 91.

The frequency response of matched filter 20 is matched to the doppler shifted frequency spectrum of the pulse sequence 90 after reflection from the target having the specific radial velocity component. This spectrum matching is accomplished by selecting the spacing of taps 22, 23, 24 and 25 to coincide with the interpulse spacing of pulse sequence 90 as it propagates through delay line 21. The phase shift values of the phase shifters 26, 27, 28 and 29 are selected so that matched filter 20 exhibits the required comb frequency response. Specifically, the pulse sequence 90 is transmitted in phase coherence with respect to its carrier. After reflection from the target having the specific radial velocity component, the carrier is doppler shifted in frequency but the pulse sequence retains its original interpulse time separation. Therefore, the returning pulse sequence is no longer coherent in phase with respect to its carrier. The phase shift values of the phase shifters 26 through 29 are therefore selected so as to bring the pulses appearing at taps 22 through 25 into phase coincidence.

Figure 3:
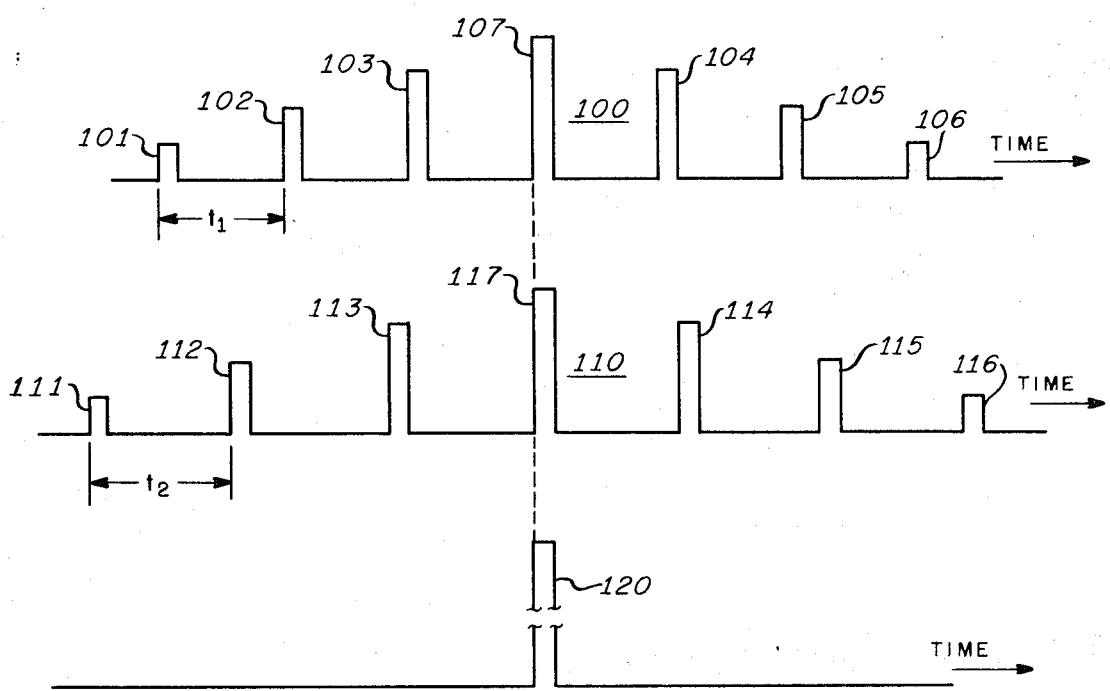
FIG. 3 is a graph representing the waveforms provided at various terminals of the apparatus shown in FIGS. 1 and 4.

Pulse group 100 as shown in FIG. 3 (to be more fully described hereinafter) represents the signals appearing at combining conductor 30 as the target reflected pulse sequence 90 propagates through delay line 21 and successively aligns with the taps 22, 23, 24 and 25.

Similarly, the matched filter 40 is matched to the comb frequency spectrum of pulse sequence 91 after reflection from the radially moving target. Pulse group 110 as shown in FIG. 3 (to be more fully described hereinafter) represents the signals appearing at combining conductor 50 as the target reflected pulse sequence 91 propagates through the delay line 41 and successively aligns with taps 42, 43, 44 and 45.

Since the signals at combining conductors 30 and 50 are pulse modulated carriers of different frequencies, envelope detectors 60 and 61 are employed to demodulate the signals thus applying only the pulse envelopes to the multiplier 70.

The demodulated signals from detectors 60 and 61 are both applied to the adder 71 and the subtractor 72 of multiplier 70. Adder 71 provides the algebraic sum of the two demodulated signals and subtractor 72 provides the algebraic difference between the two signals. The squaring circuit 73 provides the algebraic square of the sum signal and the squaring circuit 74 provides the algebraic square of the difference signal. Both the sum and the difference signals can be considered to consist of the algebraic square of the one demodulated signal, the algebraic square of the other demodulated signal as well as the cross product of both signals. When the two signals from the squaring circuits are subtracted one from the other in subtractor 75, the two squared terms are cancelled and only the desired cross product remains. Thus, the algebraic product of the two demodulated signals is provided at the terminal 80.

Referring now to FIG. 3, pulse group 100 depicts the demodulated signals appearing at the output terminal of the detector 60 (FIG. 1) and pulse group 110 depicts the demodulated signals appearing at the output terminal of the detector 60 (FIG. 1) and pulse group 110 depicts the demodulated signals appearing at the output terminal of the detector 61 (FIG. 1). Pulses 107 and 117 represent the desired responses from a target due to the reflection of the pulse sequences 90 and 91 (FIG. 2), respectively. Pulses 101 through 106 represent the range ambiguities associated with the pulse sequence 90 and pulses 111 through 116 represent the range ambiguities associated with pulse sequence 91. Since only pulses 107 and 117 are coincident in time, the result of algebraically multiplying the pulse group 100 by the pulse group 110 results in a single output pulse 120 at terminal 80 (FIG. 1). Thus, the range ambiguities are eliminated and the desired target response retained.

In the aforedescribed embodiment of the invention, the waveforms appearing at the combining conductors 30 and 50 are pulse modulated carriers of different frequencies. Detectors 60 and 61 provide the pulse envelopes of these signals to the multiplier 70 which, in turn, provides the product of these pulse envelope signals.

Figure 4:
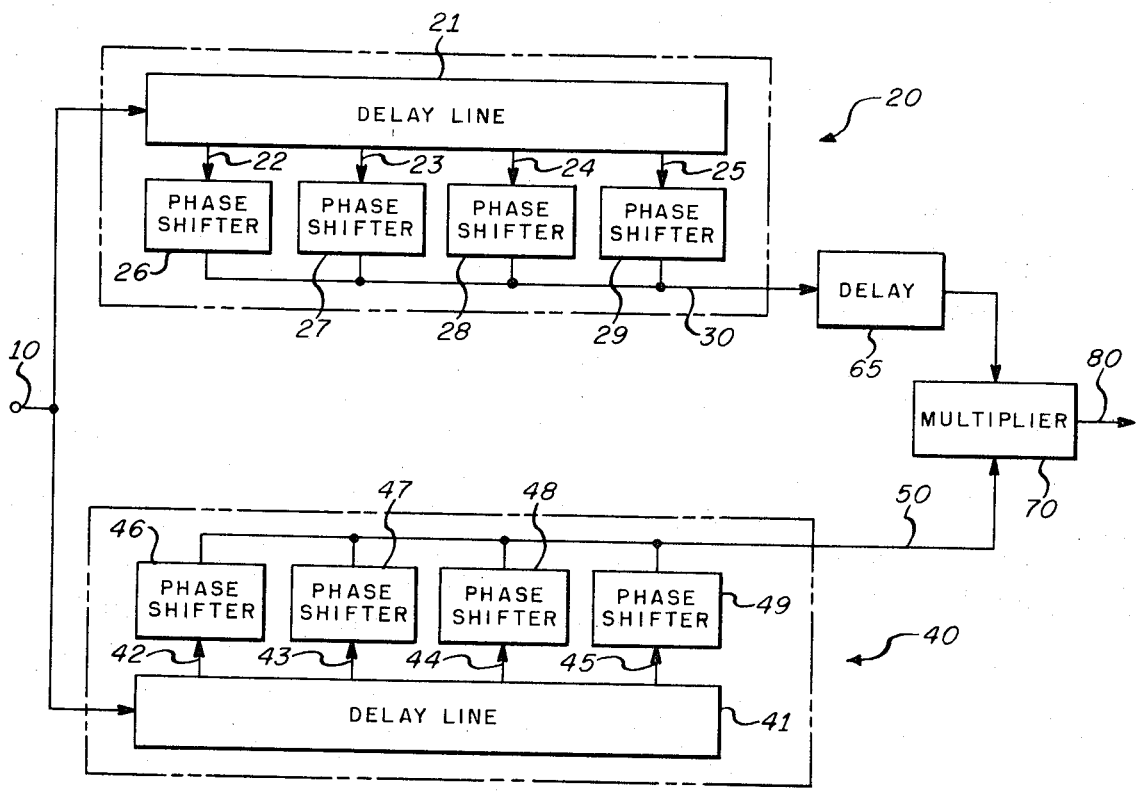
FIG. 4 is a schematic diagram in block form of a signal processor incorporating an additional embodiment of the present invention.
Figure 5:
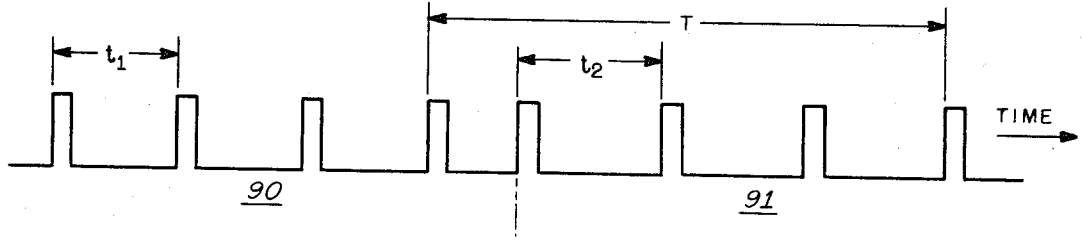
FIG. 5 is a graph representing typical waveforms transmitted by a target detection system incorporating the signal processor shown in FIG. 4.

Referring now to FIG. 4, an additional embodiment of the invention is shown in which like reference characters indicate like elements with respect to FIG. 1. This embodiment is similar to that depicted in FIG. 1 except that the pulse sequences 90 and 91 (see FIG. 5) are now transmitted sequentially with respect to each other rather than simultaneously, and the carriers now have the same frequency. The last pulse of sequence 90 (FIG. 5) is separated from the last pulse of sequence 91 (FIG. 5) by a predetermined time delay T.

Since the carrier frequencies associated with the pulse sequences 90 and 91 are now identical, band-pass filters 11 and 12 (FIG. 1) are not required for the operation of the device. Further, since the signals appearing on combining conductors 30 and 50 are now coherent in phase and frequency, detectors 60 and 61 are not required.

Pulse sequences 90 and 91 are delayed one from another by a predetermined time interval T. Delay device 65, connected between combining conductor 30 and multiplier 70, introduces a time delay equal to T between the signals on combining conductor 30 with respect to those combining conductor 50. Thus, the pulse group 100 (FIG. 3) appearing at the output of delay device 65 and the pulse group 110 (FIG. 3) appearing on combining conductor 50 have their respective desired response pulses 107 and 117 as shown in FIG. 3, aligned in time. The multiplier 70 then provides the product of the pulse group 100 with respect to the pulse group 110 as described above in connection with the embodiment of FIG. 1.

Although the multiplier 70 of FIG. 4 can be configured as shown in FIG. 1, a multiplier of the type disclosed in the Hewlett-Packard Operating and Service Manual for 1010534A/B Mixers, printed May 1967 on page 2 FIG. 2 can be utilized.

Referring now to both the aforedescribed embodiments of FIGS. 1 and 4, the matched filter 20 is adjusted by means of phase shifters 26, 27, 28 and 29 to match the doppler shifted frequency spectrum of the pulse sequence 90 after reflection from a target moving with a specific radial velocity. Similarly, the matched filter 40 is matched to the return from said target due to pulse sequence 91. Controlling equipment such as an electronic selection matrix is included (not shown) for altering the phase shift values selected so as to adjust matched filters 20 and 40 to the frequency spectra of returns from targets moving at any radial velocity within the velocity range of interest to the radar system.

Although the present invention was described with reference to the detection of a single target, the device will operate as well in a multiple target environment thus providing an unambiguous response for each target within the range of the radar system.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A signal processor for use in a system for detecting targets by transmitting a composite signal comprised of first and second sequences of pulses having different pulse repetition frequencies and processing the composite signals reflected from said targets, said processor comprising:
   first enhancing means responsive to said reflected composite signals and matched to said first sequence of pulses for providing a first enhanced signal in accordance therewith, second enhancing means responsive to said reflected composite signals and matched to said second sequence of pulses for providing a second enhanced signal in accordance therewith, and multiplying means responsive to said first and second enhanced signals for providing an output signal representative of the product of said first and second enhanced signals.

2. Apparatus of the character recited in claim 1 in which at least one of said enhancing means comprises matched filtering means.

3. Apparatus for processing composite signals comprising first and second sequences of pulses having different pulse repetition frequencies, said first and second sequences of pulses being pulse modulated carrier signals having different carrier frequencies, said apparatus comprising:

first band-pass filtering means responsive to said composite signals for transmitting a band of frequencies that includes the frequency spectrum of said first sequence of pulses and excludes the frequency spectrum of said second sequence of pulses for providing a first filtered signal, second band-pass filtering means responsive to said composite signals for transmitting a band of frequencies that includes the frequency spectrum of said second sequence of pulses and excludes the frequency spectrum of said first sequence of pulses for providing a second filtered signal, matched filtering means responsive to said first filtered signal for selectively enhancing said sequence of pulses for providing a first enhanced signal, enhancing means responsive to said second filtered signal for selectively enhancing said second sequence of pulses for providing a second enhanced signal, and multiplying means responsive to said first and second enhanced signals for providing an output signal representative of the product of said first and second enhanced signals.

4. Apparatus of the character recited in claim 3 in which said apparatus further includes first detecting means coupled between said matched filtering means and said multiplying means for demodulating said first enhanced signal for providing a first demodulated enhanced signal, and second detecting means coupled between said enhancing means and said multiplying means for demodulating said second enhanced signal for providing a second demodulated enhanced signal.

5. Apparatus of the character recited in claim 3 in which said matched filtering means comprises a delay line responsive to said first filtered signal having a sequence of taps with adjacent taps separated in accordance with the interpulse time separation of said first sequence of pulses, a sequence of phase shifters coupled respectively to said sequence of taps for providing a plurality of phase shifted signals, said phase shifters having phase shift characteristics that match the frequency response of said matched filtering means to the frequency spectrum of said first sequence of pulses, and combining means responsive to said plurality of phase shifted signals for combining said plurality of phase shifted signals for providing said first enhanced signal.

6. Apparatus of the character recited in claim 5 in which said apparatus further includes first detecting means coupled between said combining means and said multiplying means for demodulating said first enhanced signal for providing a first demodulated enhanced signal, and detecting means coupled between said enhancing means and said multiplying means for demodulating said second enhanced signal for providing a second demodulated enhanced signal.

7. Apparatus of the character recited in claim 5 in which said enhancing means comprises further matched filtering means including a delay line responsive to said second filtered signal having a further sequence of taps with adjacent taps separated in accordance with the interpulse time separation of said second sequence of pulses, a sequence of phase shifters coupled respectively to said further sequence of taps for providing a further plurality of phase shifted signals, said phase shifters having phase shift characteristics that match the frequency response of said further matched filtering means to the frequency spectrum of said second sequence of pulses, and further combining means responsive to said further plurality of phase shifted signals for combining said further plurality of phase shifted signals for providing said second enhanced signal.

8. Apparatus of the character recited in claim 7 in which said apparatus further includes first detecting means coupled between said combining means and said multiplying means for demodulating said first enhanced signal for providing a first demodulated enhanced signal, and second detecting means coupled between said further combining means and said multiplying means for demodulating said second enhanced signal for providing a second demodulated enhanced signal.

9. Apparatus of the character recited in claim 8 in which said multiplying means comprises adding means responsive to said first and second demodulated enhanced signals for providing a summed signal representative of the sum thereof, subtracting means responsive to said first and second demodulated enhanced signals for providing a difference signal representative of the difference therebetween, first squaring means responsive to said summed signal for providing a first squared signal representative of the square thereof, second squaring means responsive to said difference signal for providing a second squared signal representative of the square thereof, and subtracting means responsive to said first and second squared signals for subtracting said second squared signal from said first squared signal for providing said output signal.

10. Apparatus for processing composite signals comprising first and second sequences of pulses having different pulse repetition frequencies, said first and second sequences of pulses being noncoincident with respect to each other and having one pulse of said first sequence of pulses separated from one pulse of said second sequence of pulses by a predetermined delay, said apparatus comprising:

matched filtering means responsive to said composite signals for selectively enhancing said first sequence of pulses for providing a first enhanced signal, enhancing means responsive to said composite signals for selectively enhancing said second sequence of pulses for providing a second enhanced signal, multiplying means responsive to said first and second enhanced signals for providing an output signal representative of the product of said first and second enhanced signals, and delaying means for effectively delaying one of said enhanced signals with respect to the other of said enhanced signals by said predetermined delay.

11. Apparatus of the character recited in claim 10 in which said delaying means is coupled between said matched filtering means and said multiplying means.

12. Apparatus of the character recited in claim 10 in which said delaying means is coupled between said enhancing means and said multiplying means.

13. Apparatus of the character recited in claim 10 in which said matched filtering means comprises
- a delay line responsive to said composite signals having a sequence of taps with adjacent taps separated in accordance with the interpulse time separation of said first sequence of pulses,
- a sequence of phase shifters coupled respectively to said sequence of taps for providing a plurality of phase shifted signals, said phase shifters having phase shift characteristics that match the frequency response of said matched filtering means to the frequency spectrum of said first sequence of pulses, and
- combining means responsive to said plurality of phase shifted signals for combining said plurality of phase shifted signals for providing said first enhanced signal.

14. Apparatus of the character recited in claim 13 in which said enhancing means comprises further matched filtering means including
- a delay line responsive to said composite signals having a further sequence of taps with adjacent taps separated in accordance with the interpulse time separation of said second sequence of pulses,
- a sequence of phase shifters coupled respectively to said further sequence of taps for providing a further plurality of phase shifted signals, said phase shifters having phase shift characteristics that match the frequency response of said further matched filtering means to the frequency spectrum of said second sequence of pulses, and
- further combining means responsive to said further plurality of phase shifted signals for combining said further plurality of phase shifted signals for providing said second enhanced signal.

15. Apparatus of the character recited in claim 14 in which said delaying means is coupled between said combining means and said multiplying means.

* * * * *